United States Patent
Sirpal et al.

(10) Patent No.: US 9,871,991 B2
(45) Date of Patent: Jan. 16, 2018

(54) SYSTEM AND METHOD FOR DISPLAY DEVICE CONFIGURATION

(71) Applicants: Jamdeo Canada Ltd., Oakville (CA); HISENSE USA CORP., Suwanee, GA (US); Hisense Electric Co., Ltd., Qingdao, Shandong (CN); Hisense International Co., Ltd., Qingdao (CN)

(72) Inventors: Sanjiv Sirpal, Oakville (CA); Mohammed Selim, Oakville (CA); Alexander De Paz, Burlington (CA); Salvador Soto, Toronto (CA); Saulo Dourado, Oakville (CA); Fuqu Wu, Burlington (CA); Dean Britto, Mississauga (CA)

(73) Assignees: Jamdeo Canada Ltd., Oakville, ON (CA); Hisense USA Corp., Suwanee, GA (US); Hisense Electric Co., Ltd., Qingdao, Shandong (CN); Hisense International Co., Qingdao, Shandong (CN)

( * ) Notice: Subject to any disclaimer, the term of this patent is extended or adjusted under 35 U.S.C. 154(b) by 0 days.

(21) Appl. No.: 14/674,908

(22) Filed: Mar. 31, 2015

(65) Prior Publication Data
US 2015/0281626 A1   Oct. 1, 2015

Related U.S. Application Data

(60) Provisional application No. 61/972,922, filed on Mar. 31, 2014.

(51) Int. Cl.
*H04N 5/44* (2011.01)
*H04N 5/445* (2011.01)
(Continued)

(52) U.S. Cl.
CPC ....... *H04N 5/44504* (2013.01); *G06F 3/0482* (2013.01); *G06F 3/0484* (2013.01);
(Continued)

(58) Field of Classification Search
CPC ...................................................... H04N 5/44
(Continued)

(56) References Cited

U.S. PATENT DOCUMENTS 8,392,877 B1 *   3/2013   Chiluvuri ................. G06F 8/36
                                                   717/106
8,629,939 B1 *   1/2014   Freund .................. H04N 5/145
                                                   348/468

(Continued)

*Primary Examiner* — Paulos M Natnael
(74) *Attorney, Agent, or Firm* — Gordon & Rees, LLP

(57) ABSTRACT

The present disclosure relates to electronic devices, processes and systems for configuration of a display device. In one embodiment, a method for configuring operation of a display device includes receiving a configuration change from a control device, wherein the configuration change includes one or more changes for presentation of a overlay element for the display device and configuring settings for presentation of a overlay element, wherein the configuration change corresponds to a release of one or more features previously included and inaccessible to settings for presentation of the overlay element by the display device. The method also includes presenting an overlay element based on the configuring, wherein the overlay element is presented by the display device as an overlay to displayed image content. Overlay elements can include a navigation bar, an animation, a poster display, sticker display, and an application home screen.

21 Claims, 10 Drawing Sheets

(51) Int. Cl.
*G06F 3/0481* (2013.01)
*G06F 3/0482* (2013.01)
*G06F 3/0484* (2013.01)
*H04N 21/431* (2011.01)
*H04N 21/485* (2011.01)

(52) U.S. Cl.
CPC ....... *G06F 3/04817* (2013.01); *H04N 5/4403* (2013.01); *H04N 5/44543* (2013.01); *H04N 5/44591* (2013.01); *H04N 21/4312* (2013.01); *H04N 21/4858* (2013.01); *H04N 2005/44569* (2013.01)

(58) Field of Classification Search
USPC .......................................... 348/563–566, 569
See application file for complete search history.

(56) References Cited

U.S. PATENT DOCUMENTS

| | | | | |
|---|---|---|---|---|
| 8,943,441 B1* | 1/2015 | Patrick | ................. | G06F 3/0484 345/440 |
| 9,300,645 B1* | 3/2016 | Rao | ................. | H04L 63/08 |
| 2003/0028892 A1* | 2/2003 | Gewickey | ........ | H04N 21/23614 725/110 |
| 2004/0268413 A1* | 12/2004 | Reid | ....................... | G06Q 30/02 725/131 |
| 2005/0097008 A1* | 5/2005 | Ehring | ................. | G06F 17/211 715/205 |
| 2007/0282890 A1* | 12/2007 | Kashiwagi | ............ | G06F 9/4443 |
| 2008/0172608 A1* | 7/2008 | Patrawala | ............... | H04L 67/02 715/255 |
| 2009/0077500 A1* | 3/2009 | Perrin | ............... | G06F 17/30873 715/835 |
| 2009/0172543 A1* | 7/2009 | Cronin | ................. | G06F 3/04847 715/721 |
| 2009/0276730 A1* | 11/2009 | Aybes | .................... | G06F 3/0482 715/825 |
| 2010/0262462 A1* | 10/2010 | Tryfon | ............... | G06Q 30/0203 705/7.32 |
| 2011/0201911 A1* | 8/2011 | Johnson | ............. | A61B 5/14532 600/365 |
| 2011/0205435 A1* | 8/2011 | Lee | .................... | H04N 5/44543 348/563 |
| 2012/0036220 A1* | 2/2012 | Dare | ........................ | G06F 8/61 709/217 |
| 2012/0176543 A1* | 7/2012 | Jeong | .................. | G06F 3/04883 348/563 |
| 2013/0088511 A1* | 4/2013 | Mitra | .................... | G06F 3/0483 345/629 |
| 2013/0151963 A1* | 6/2013 | Costenaro | ............. | G06F 3/0481 715/711 |
| 2014/0043534 A1* | 2/2014 | Nakaoka | ............... | H04N 13/007 348/563 |
| 2014/0046728 A1* | 2/2014 | Tryfon | ............... | G06Q 30/0203 705/7.32 |
| 2014/0074909 A1* | 3/2014 | Gunderson | ......... | H04L 12/1822 709/203 |
| 2014/0096025 A1* | 4/2014 | Mandel | ................... | H04L 67/34 715/739 |
| 2014/0351715 A1* | 11/2014 | Huang | .................. | H04L 65/403 715/753 |
| 2015/0100884 A1* | 4/2015 | Ryu | ....................... | G09G 5/397 715/719 |
| 2015/0193700 A1* | 7/2015 | Bastin | .................... | G06Q 10/02 705/5 |
| 2015/0370455 A1* | 12/2015 | Van Os | ............... | G06F 3/04842 345/173 |

* cited by examiner

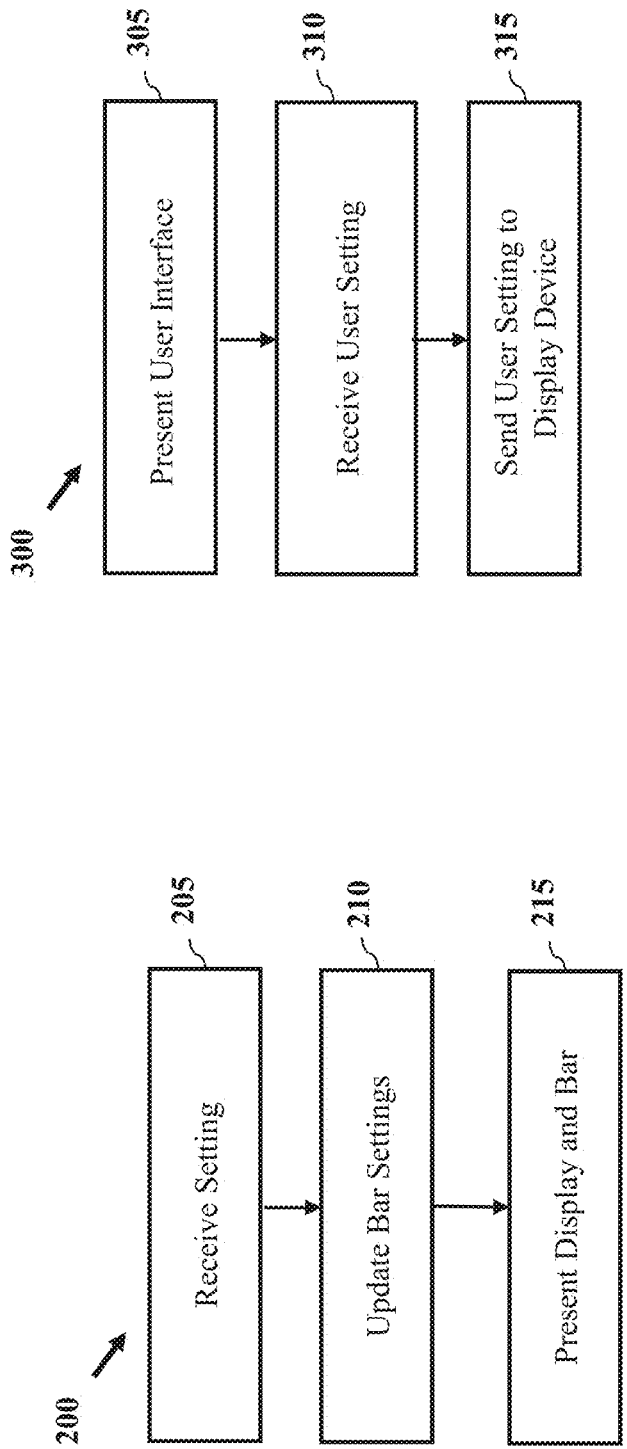

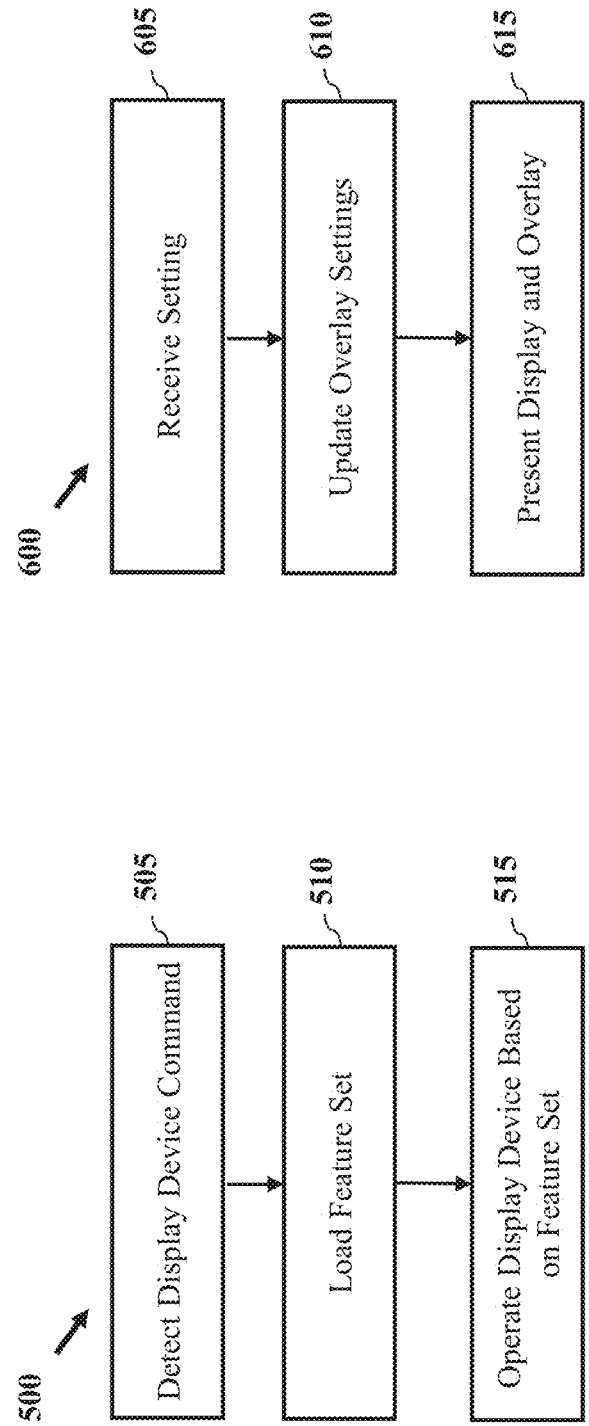

SYSTEM AND METHOD FOR DISPLAY DEVICE CONFIGURATION

PRIORITY

This application claims priority to U.S. Provisional Application No. 61/972,922 titled ALWAYS CONNECTED TO SMART TV filed on Mar. 31, 2014, the content of which is expressly incorporated by reference in its entirety.

FIELD

The present disclosure relates to electronic devices and applications, and more particularly to display and content presentation devices.

BACKGROUND

Television receivers have long been used to present broadcast TV content. Similarly, television receivers have been used to present video content received from a stand-alone players. With advances in networking and developments in providing data to end users, there is a need for systems and methods to present content on display devices such as televisions.

BRIEF SUMMARY OF THE EMBODIMENTS

Disclosed and claimed herein are methods, devices and systems for method for configuring operation of a display device. One embodiment is directed to a method including receiving, by a display device, a configuration change from a control device, wherein the configuration change includes one or more changes for presentation of a navigation bar for the display device, and configuring, by the display device, settings for presentation of a navigation bar, wherein the settings are modified by the one or more changes to the navigation bar and wherein the configuration change corresponds to a release of one or more features previously included and inaccessible to settings for presentation of the navigation bar by the display device. The method also includes presenting, by the display device, a navigation bar based on the configuring, wherein the navigation bar is presented by the display device as an overlay to displayed image content.

In one embodiment, the configuration change includes addition of an application for inclusion in the navigation bar.

In one embodiment, a configuration change includes at least one of a modification to features available for selection in the navigation bar and layout of the navigation bar.

In one embodiment, the display device receives the configuration change from the control device configured with a companion application for the display device.

In one embodiment, the navigation bar includes graphical elements for selection of one or more of applications, inputs and control menus for the display device.

In one embodiment, presenting includes presentation of the navigation bar as a scrollable list of graphical elements.

Another embodiment is directed to a system including a control device and a display device. The display device is configured to receive a configuration change from a control device, wherein the configuration change includes one or more changes for presentation of a overlay element for the display device, and configure settings for presentation of the overlay element, wherein the settings are modified by the one or more changes to the navigation bar and wherein the configuration change corresponds to a release of one or more features previously included and inaccessible to settings for presentation of the overlay element by the display device. The display device is configured to present the overlay element based on the configuring, wherein the overlay element is presented by the display device as an overlay to displayed image content.

In one embodiment, the overlay element is a navigation bar.

In one embodiment, the overlay element is an animation for display during wake and sleep operations of the display device.

In one embodiment, the overlay element is at least one of a poster and sticker display.

In one embodiment, the overlay element relates to an application home screen.

In one embodiment, the configuration change includes addition of an application for inclusion in the navigation bar.

In one embodiment, a configuration change includes at least one of a modification to features available for selection in the navigation bar and layout of the navigation bar.

In one embodiment, the display device receives the configuration change from the control device configured with a companion application for the display device.

In one embodiment, the navigation bar includes graphical elements for selection of one or more of applications, inputs and control menus for the display device.

In one embodiment, presenting includes presentation of the navigation bar as a scrollable list of graphical elements.

Another embodiment is directed to a method for configuring operation of a display device, the method including receiving, by a display device, a configuration change from a control device, wherein the configuration change includes one or more changes for presentation of a overlay element for the display device and configuring, by the display device, settings for presentation of a overlay element, wherein the settings are modified by the one or more changes to the overlay element and wherein the configuration change corresponds to a release of one or more features previously included and inaccessible to settings for presentation of the overlay element by the display device. The method also including presenting, by the display device, an overlay element based on the configuring, wherein the overlay element is presented by the display device as an overlay to displayed image content.

In one embodiment, the overlay element is a navigation bar.

In one embodiment, the overlay element is an animation for display during wake and sleep operations of the display device.

In one embodiment, the overlay element is at least one of a poster and sticker display.

In one embodiment, the overlay element relates to an application home screen.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 2 depicts a process for presentation of a navigation bar according to one or more embodiments;

FIG. 3 depicts a process for configuration of a display device according to one or more embodiments;

FIG. 5 depicts a process for display device operation according to one or more embodiments;

FIG. 6 depicts a process for companion device configuration according to one or more embodiments;

DETAILED DESCRIPTION OF THE EXEMPLARY EMBODIMENTS

Overview and Terminology

One aspect of the disclosure relates to display device operation, and in particular systems and methods for configuration of a display device. A display device may relate to a TV or monitor unit for presentation of content. A display device may relate to a traditional type of TV for viewing broadcast content. Display device may also apply to devices configured to receive content from one or more input sources channels, such as network, streaming, on demand, etc. Display devices may be configured with various inputs or connections. With advances in display devices, there is a desire to retain controllability with a simple remote control having a numerical key pad and directional commands while allowing for configuration of the display device user interface. Users of display devices have varying capabilities. Some users may prefer a simple configuration for controlling. Others desire a rich experience and customization.

According to one embodiment, a system and method are provided for configuring a display device, such as a smart TV or cinema display (playback device). The configuration may be based on a display device configured to allow for simplified management of settings (brightness/contrast) with pre-canned image modes, and sound modes (no user settings on TV). According to one embodiment, complex features and management functionality may be configured to occur outside the TV menus (i.e. network/cloud based configuration).

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
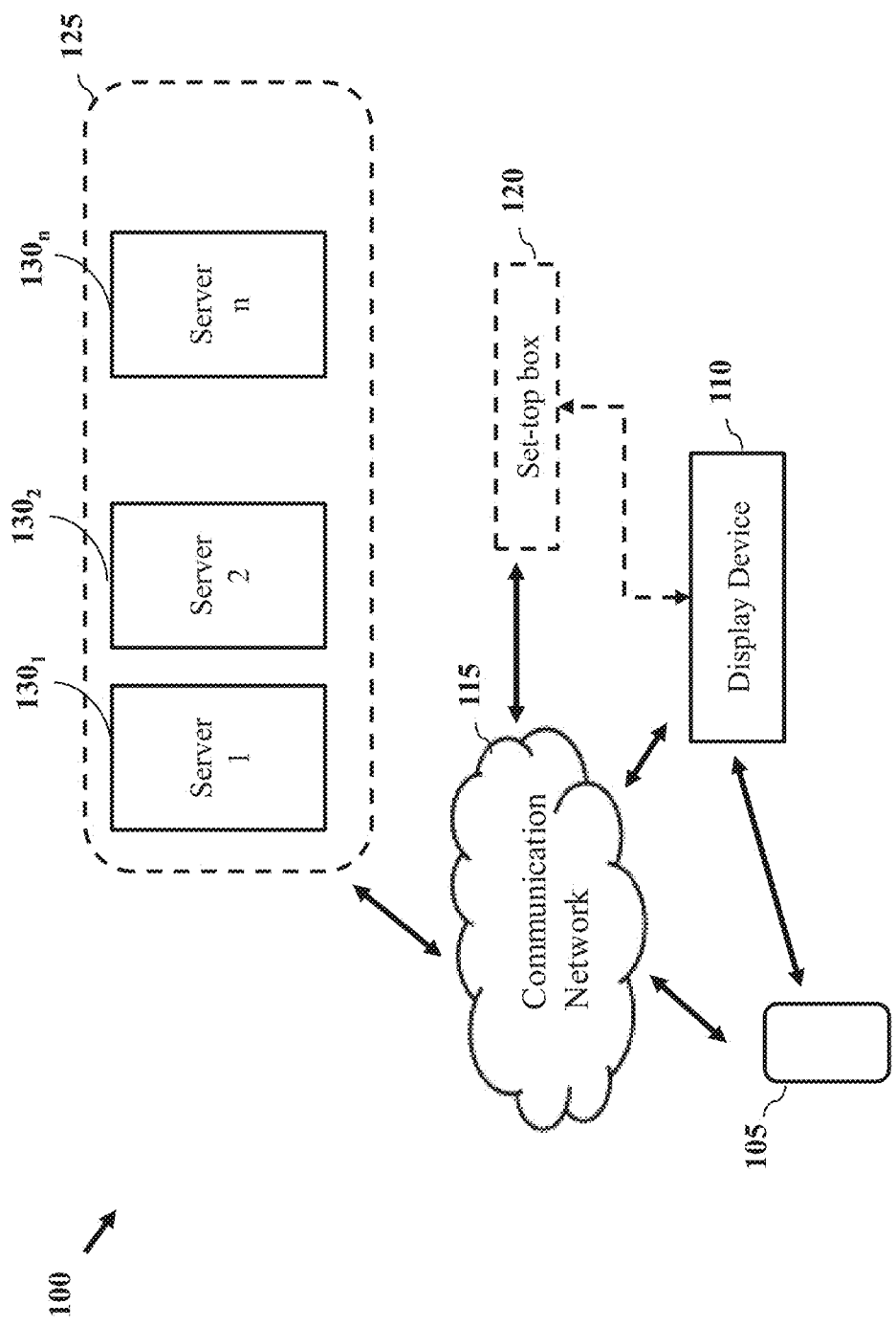
FIG. 1 depicts a simplified system diagram according to one or more embodiments.

Referring now to the figures, FIG. 1 depicts a simplified system diagram according to one or more embodiments. System 100 includes control device 105 and display device 110. System 100 allows for control device 105 to configure display device 110. By way of example, configuration of display device 110 can allow for one or more presentation settings of display device 110 to be configured, modified or updated. By way of further example, configuration of display device 110 can allow for functionality of display device 110 to be unlocked. In certain embodiments, configuration of display device 110 includes customizing presentation of overlay items, such as navigation menus. In other embodiments, configuration of display device 110 allows for adding one or more display attributes associated with control and/or operation of display device 110.

Control device 105 relates to electronic device having a display and a network connection. Control device 105 may relate to a mobile device or personal connection device running an application that allows for configuration of display device 110. In that sense, control device 105 is not required to be hardware dedicated only for display device 110. Control device 105 may be a companion device, or device operating an application that is associated with the user interface controls of the display device. Control device 105 may be a mobile device (e.g., personal communication device, etc.) or mobile computing device (e.g., personal computer, tablet, etc.). Control device 105 in some embodiments may be configured to operate as a remote control for traditional display device such as channel tuning, volume control, picture correction, etc.

Display device 110 may relate to television or display device in general configured to provide video or image output from one or more selected sources or channels. Display device 110 may be controlled by a remote control, such as remote control with directional pad. In certain embodiments, display device 110 may be configured as a smart TV or a cloud/linux based, always connected cinema TV for instant on video-on-demand (VOD) consumption. Display device 110 may be configured to provide cloud based content in addition to broadcast TV content. Display device 110 may multi-device aware of other TV's, companion devices, and accessories.

As shown in FIG. 1, system 100 allows for control device 105 to communicate with display device 110 by way of communication network 115 which may be a local network (e.g., LAN, etc.), cellular, internet, or other communication network. It should be appreciated that control device 105 may be configured to communicated directly with display device 110 in certain embodiments. Display device 110 may interoperate with a set-top box 120 which may be optional. In certain embodiments, a control device 105 may be configured to configure a user interface, menu or control options of set-top box 120 in combination with or separate from display device 110.

According to another embodiment, control device 105 and display device 110 may be configured to communicate via communication network 115 with one or more cloud based servers. System 100 depicts cloud 125 including servers $130_{1-n}$ according to one or more embodiments. Control device 105 and display device 110 may communicate with one or more of servers $130_{1-n}$ for content and/or configuration for display device 110.

As will be discussed in more detail below, display device 110 may be configured to modify one or more settings for presentation of display elements, such as an overlay element or navigation bar. Settings of the display device may be modified based on one or more changes to the overlay element or navigation bar. According to one embodiment, configuration changes may corresponds to a release or unlocking of one or more features previously included and inaccessible to settings for presentation of the overlay element by the display device. By way of example, display devices may typically be shipped to customers with a preset configuration. However, features of display device 110 may require a user to unlock or configure certain features. In that fashion, the display device 110 may be shipped with a light weight configuration and simple operation while also allowing for customization.

Display device 110 may be configured to receive configuration changes from control device 105, and one or more other control devices, for configuring the display device. Following configuration, display device 110 can, for example, present overlay elements based on the configuring. An overlay element is presented by display device 110 as an overlay (e.g., superimposed) to displayed image content.

Display device 110 may be configured to operate with a low powered chipset and minimalistic hardware specs lowering hardware costs. In addition, Display device 110 may be configured to operate with a cloud based UI which allows for reduced time to market for initial hardware releases, and easy deployment of new features to existing hardware. Display device 110 may be configured to operate with cloud enabled services. Display device 110 may be configured to use advanced HDMI features such as CEC and HDMI Ethernet Channel and may supports third party set-top box (STB) & peripherals (e.g., HDMI, CEC Control).

FIG. 2 depicts a process for presentation of a navigation bar according to one or more embodiments. Process 200 may be employed by a display device (e.g., display device 110). Process 200 may be initiated at block 205 with receiving a setting 205. A display device may be configured to receive one or more settings at block 205 for configuration. In certain embodiments, the settings may relate to one or more user configurations for overlay elements, such as navigation bars, graphical elements, animations, etc. Control changes received by the display device may relate to one or more configuration changes from a control device, such as a companion device. In one embodiment, configuration changes include one or more changes for presentation of a navigation bar for the display device. As such, configuration changes can include the addition of an application for inclusion in the navigation bar. According to one embodiment, configuration changes can include at least one of a modification to features available for selection in the navigation bar and layout of the navigation bar. Configuration changes received by the display device at block 205 may be received the from the control device configured with a companion application for the display device.

A block 210, the display device may update or configure settings for presentation of a navigation bar. The settings may be modified by the one or more changes to the navigation bar and wherein the configuration change corresponds to a release of one or more features previously included and inaccessible to settings for presentation of the navigation bar by the display device. By way of example, updating or configuring at block 210 may release features that are already stored by the interface of the display device and which are not currently in the configuration of the display device.

At block 215, the display device presents a navigation bar based on the configuring. The navigation bar may be presented by the display device as an overlay to displayed image content at block 215. The display device can present the navigation bar based on a user selection on a remote control for selection of an input, channel or application of the display device. Presentation of the navigation bar includes graphical elements for selection of one or more of applications, inputs and control menus for the display device. In certain embodiments, presentation of a navigation bar at block 215 includes presentation of the navigation bar as a scrollable list of graphical elements.

Process 200 allows for customization of navigation bar presentation. By configuring the navigation bar of display device 110 by control device 105, complexity of the configuration may be offset from display device 110 to control device 105. Process 200 is described with reference to a navigation bar, however it should be appreciated that process 200 may be employed for configuration of one or more other overlays for the display device.

FIG. 3 depicts a process for configuration of a display device according to one or more embodiments. Process 300 may be employed by a control device (e.g., control device 105) to provide one or more settings to a display device. Process 300 may be initiated at block 305 with presenting a user interface. The user interface may allow for presentation and selection of one or more overlay elements, configuration changes, applications, and editing of a navigation bar for a display device. According to one embodiment, the control device executes a companion application to the application/operating software of the display device. An exemplary representation of a user interface is discussed in more detail below with respect to FIG. 9.

Process 300 may continue with receiving a user setting a block 310. By way of example, a user may select an application to add to a navigation bar of a display device. As such, the control device may issue a configuration change including the addition of an application for inclusion in the navigation bar. Alternatively, or in combination, the configuration change includes at least one of a modification to features available for selection in the navigation bar and layout of the navigation bar. According to another embodiment, user settings received at block 310 may relate to selection or indication of one or more overlays for a display device. User settings are sent to the display device at block 315. The display device receives the configuration change from the control device, such as a device configured with a companion application for the display device.

Figure 4A:
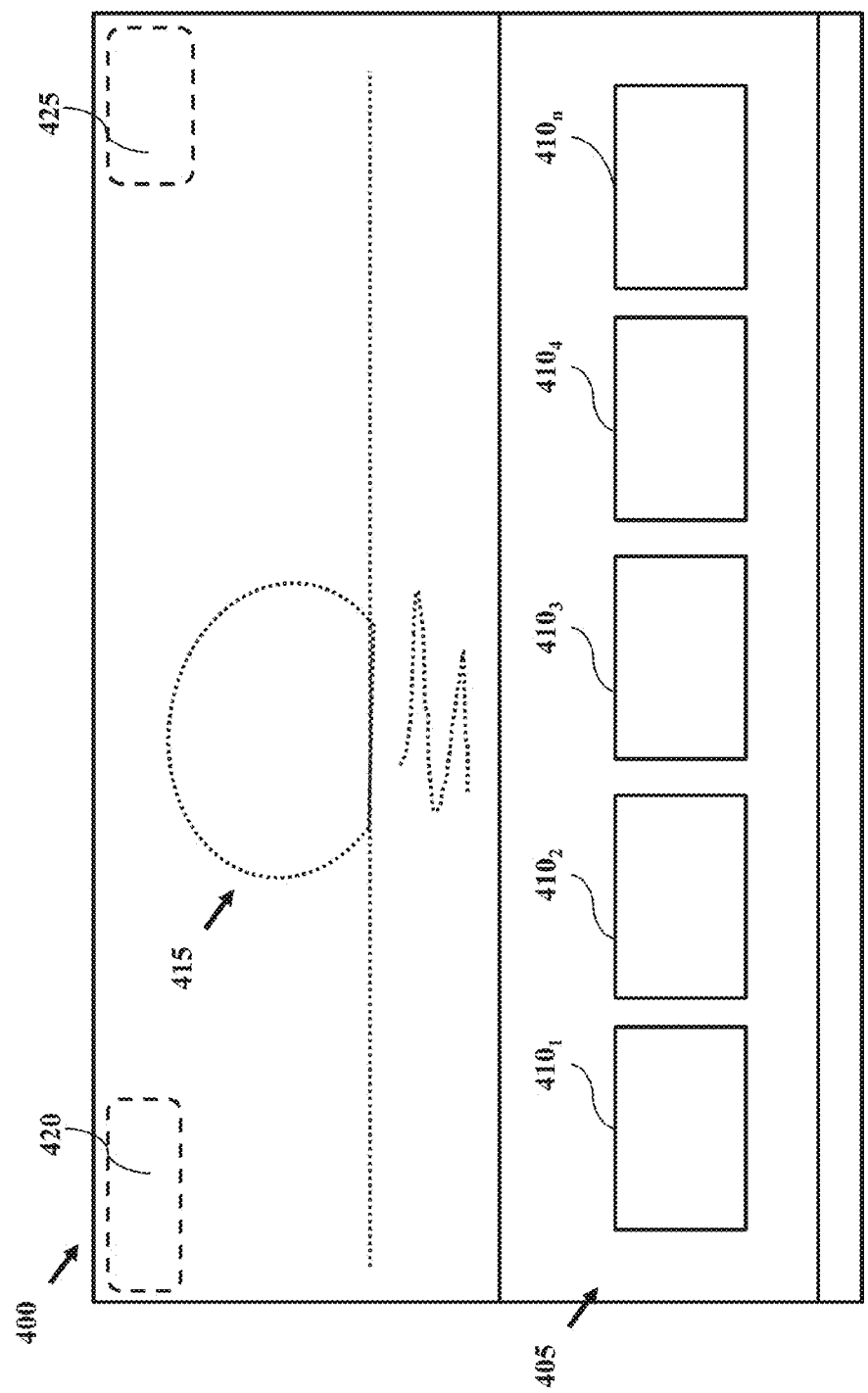
FIGS. 4A-4C depict graphical representations of display device presentations according to one or more embodiments.
Figure 4B:
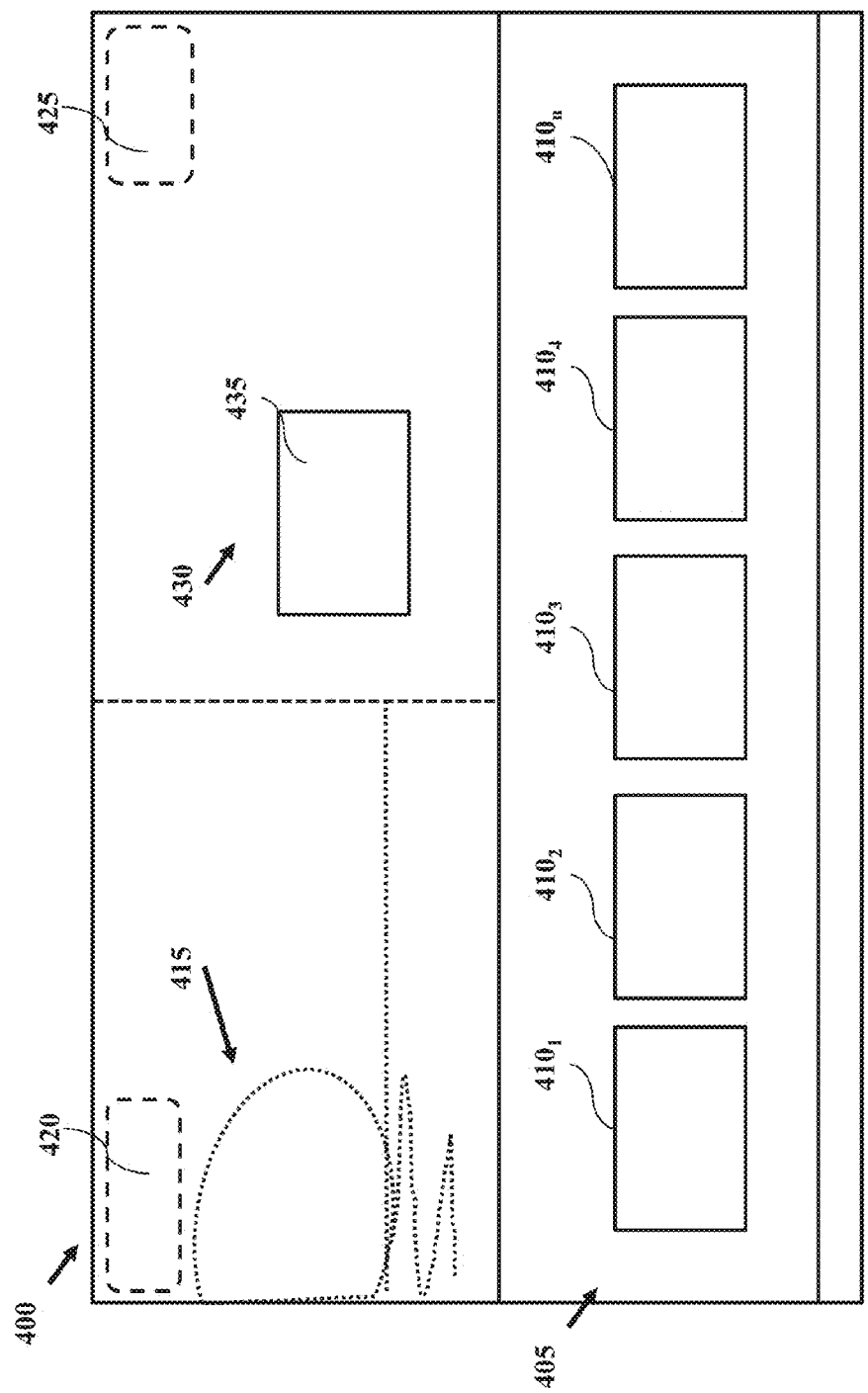
Figure 4C:
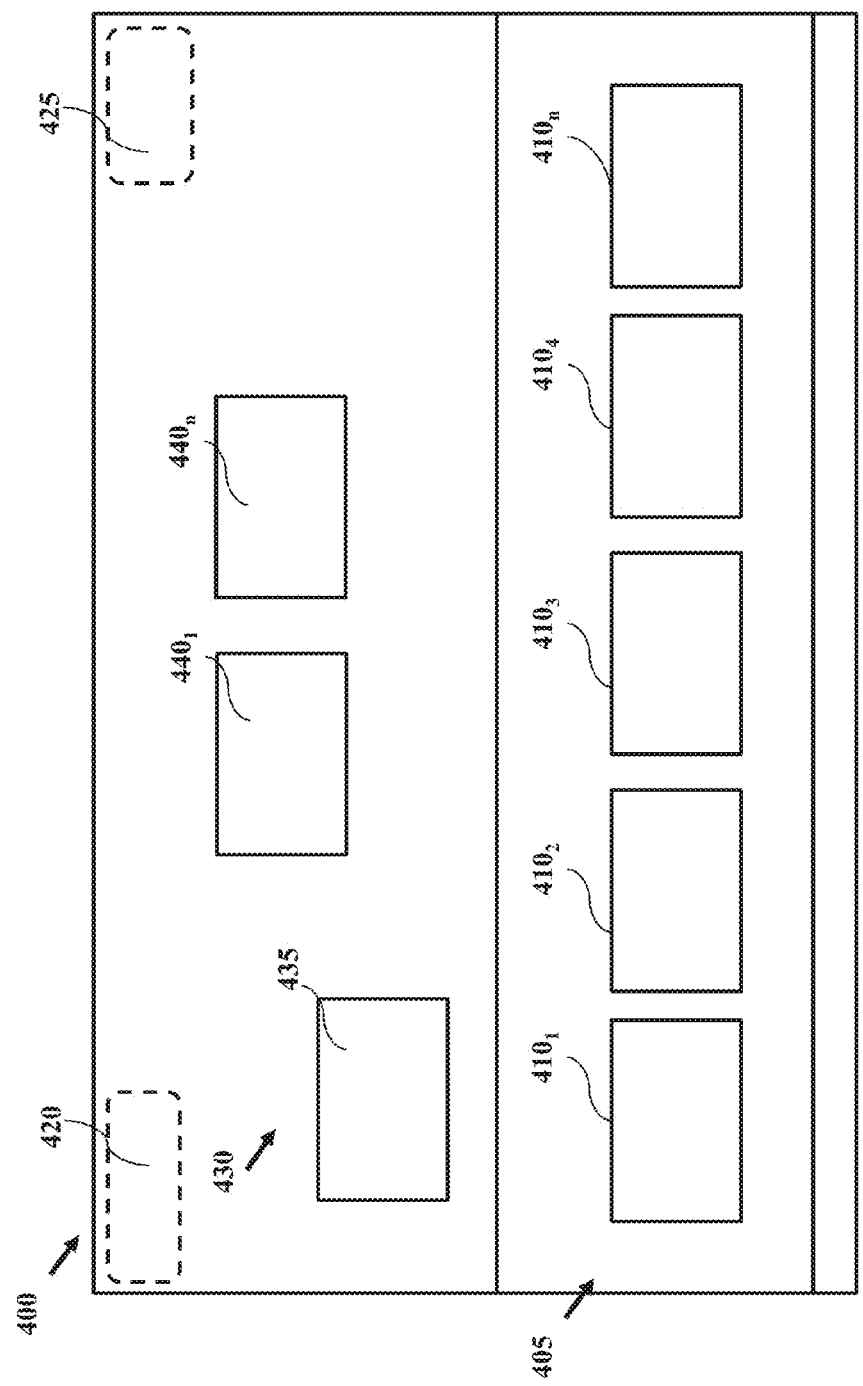

FIGS. 4A-4C depict graphical representations of display device presentations according to one or more embodiments. FIG. 4A depicts display 400 including one or more graphical elements. Display 400 may relate to the display window of a display device (e.g., display device 110). According to one embodiment, display 400 may include an overlay element, such as navigation bar 405. Navigation bar 405 includes graphical elements $410_{1-n}$ for selection of one or more of applications, inputs and control menus for the display device. According to one embodiment, navigation bar 405 overlays image display 415. Image display 415 may be broadcast video or image data. Navigation bar 405 may be displayed in response to a user command. Presentation of navigation bar 405 can include be a scrollable list of graphical elements, such as horizontal or vertical scrolling of one or more rows of elements. Navigation bar 405 includes graphical elements for selection of one or more of applications, inputs and control menus for the display device.

According to one embodiment, processes are described herein for configuration and direction of changes to any aspect or portion of display includes addition of an application for inclusion in the navigation bar. A configuration change includes at least one of a modification to features available for selection in the navigation bar 405 and layout of navigation bar 405.

Display window 400 may optionally include one or more graphical elements such as optional network identification 420 and optional time display 425.

FIG. 4B depicts selection of navigation bar 405 according to one or more embodiments. Selection of navigation bar may switch image 415 display 415 and transition display window 400 to transition based on the selection. FIG. 4B depicts transition of image 415 to display window 430 including graphical element 435. FIG. 4C depicts display window 430 fully transitioned including graphical element 435. Graphical element 435 may relate to an input that is available for selection. In other embodiments, graphical element 435 may relate to an application. In yet another embodiment, graphical element 435 may relate to a feature added to the navigation bar 405 based on a previous user selection of a control device (e.g., control device 110). FIG. 4C depicts display window 430 with graphical element 435 and one or more additional graphical elements 440$_{1-n}$. In certain embodiments, graphical elements 440$_{1-n}$ relate to feature added to user interface based on a previous user selection of a control device.

FIG. 5 depicts a process for display device operation according to one or more embodiments. Process 500 may be performed following configuration of a display device. Process 500 may be initiated the display device detecting a display device command at block 505. Display command may relate to selection of a menu key and/or selection or a navigation bar. In certain embodiments, display device commands can relate to sleep/wake (e.g., power off/power on) commands for the display device.

At block 510, the display device loads a feature set based on the display command. The feature set may relate to one or more applications or graphical elements for presentation of a menu. In other embodiments, the feature set may relate to applications or customizations made in addition to present operational software for the display device. By way of example, the feature set can identify the addition of an application for inclusion in the navigation bar. The feature set may include modifications to features available for selection in the navigation bar and layout of the navigation bar.

At block 515, the display device may be operated based on the feature set. When the feature set relates to, or includes, changes to a navigation bar, the display device may be operated at block 515 with a configuration change including addition of an application for inclusion in the navigation bar. Alternatively, or in addition, operation at block 515 may be based on a configuration change including at least one of a modification to features available for selection in the navigation bar and layout of the navigation bar.

When the feature set relates to, or includes, changes to an overlay element, the display device may be operated at block 515 to present the overlay element. For example, block 515 may include operation for presentation of one or more of an overlay element is an animation for display during wake and sleep operations of the display device, an overlay element is at least one of a poster and sticker display, and an application home screen.

FIG. 6 depicts a process for presentation of a navigation bar according to one or more embodiments. Process 600 may be employed by a display device (e.g., display device 110) for configuring one or more overlay elements for a display device. Process 600 may be initiated at block 605 with receiving a setting 605. A display device may be configured to receive one or more settings at block 605 for configuration. In certain embodiments, the settings may relate to one or more user configurations for overlay elements, such as navigation bars, graphical elements, animations, etc. Configuration changes received by the display device at block 605 may be received the from the control device configured with a companion application for the display device.

A block 610, the display device may update or configure settings for presentation of an overlay element. By way of example, updating or configuring at block 610 may release features that are already stored by the interface of the display device and which are not currently in the configuration of the display device, such as one or more of an overlay element is an animation for display during wake and sleep operations of the display device, an overlay element is at least one of a poster and sticker display, and an application home screen. At block 615, the display device can present an overlay element based on the configuring.

Figure 7A:
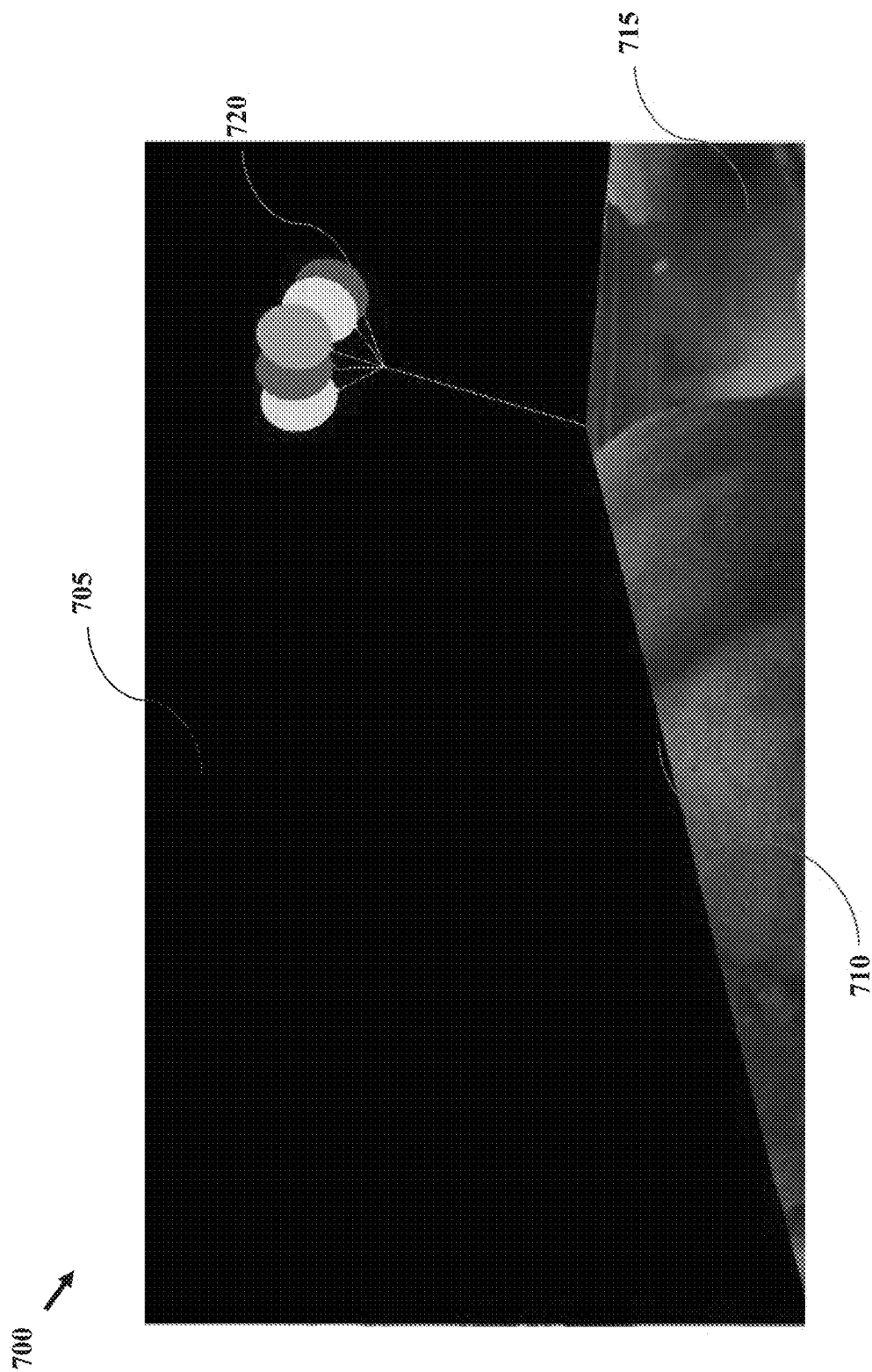
FIGS. 7A-7B depict graphical representations of display device presentations according to one or more embodiments.
Figure 7B:
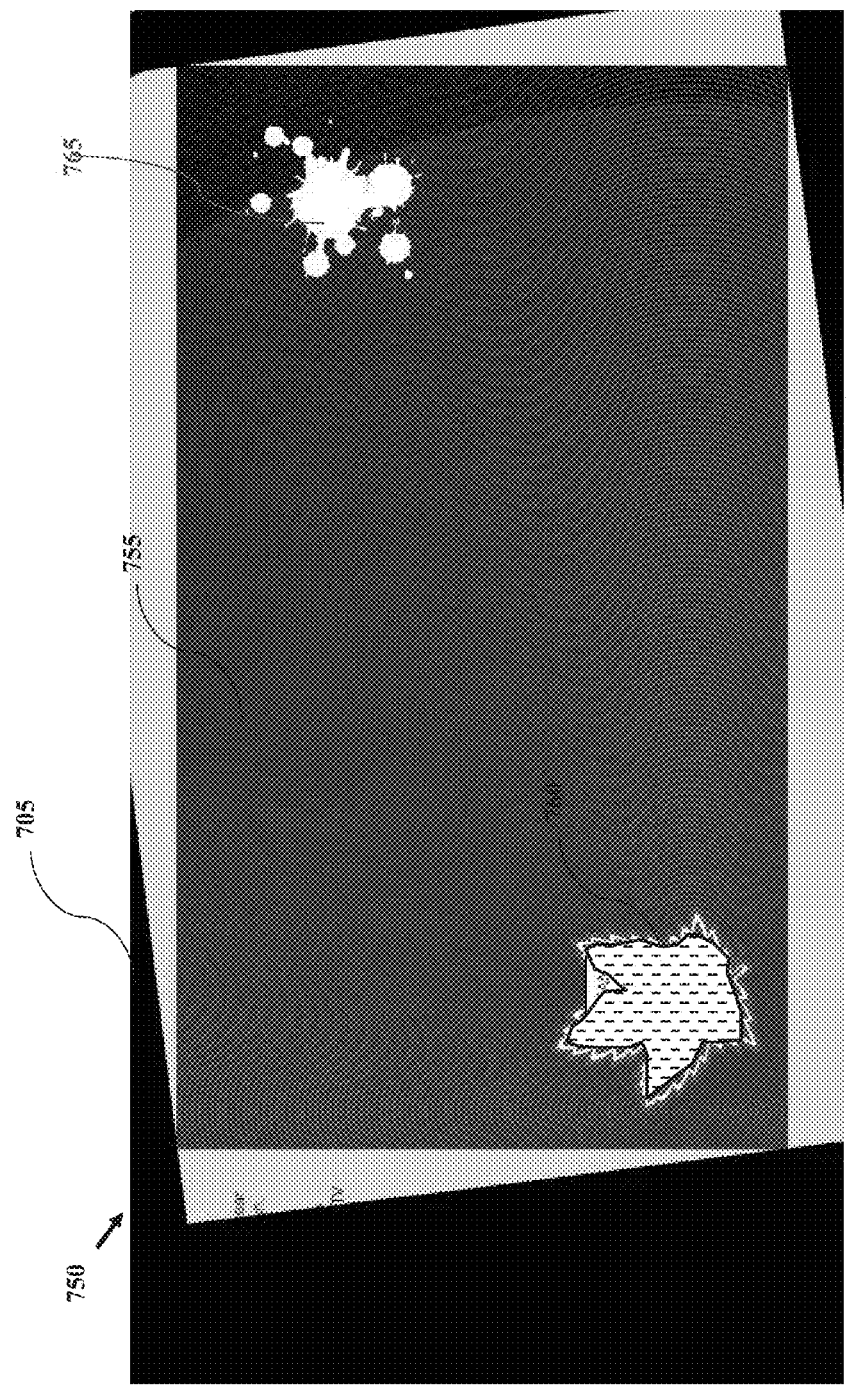

FIGS. 7A-7B depict graphical representations of display device presentations according to one or more embodiments. FIG. 7A depicts an exemplary representation of an overlay element according to one embodiment. FIG. 7A depicts display device configuration 700 with display window 705 for a transition between displayed image content and a wake/sleep function. According to one embodiment, a display device may transition from image content to an all black screen (sleep) wherein the screen fades to black in a horizontal, vertical or other directions. According to another embodiment, a display device may transition from a black screen to image content (wake) wherein the screen fades from black to image data in a horizontal, vertical or other directions. FIG. 7A depicts the transition 710 between image content 715 and a black screen. According to an optional embodiment, transition 710 may be accompanied and/or presented with an animation, such as animation 720. Animation 720 relates to balloons which rise (or fall) with a wake function and appear to tug or pull transition 710.

FIG. 7B depicts an exemplary representation of an overlay element according to one embodiment. FIG. 7B depicts display device configuration 750 with display window 705 for a poster/sticker elements according to one or more embodiments. Display device 750 includes poster 755 with exemplary stickers 760 and 765. Poster 755 and/or stickers 760 and 765 may relate to overlays that cover part or all of image content. In certain embodiments, these overlay elements may be displayed when a user selects a home or menu screen. In other embodiments, these images may be displayed with operation of a display device, such as for one or more of powering on and off, changing channels, selection of a particular channel/input, etc. Overlay elements for poster 755 and/or stickers 760 and 765, or other overlay elements may be selected from a companion application on a control device. In addition, the position and when the overlay elements are to appear in a display device may be set by the companion device.

Figure 8:
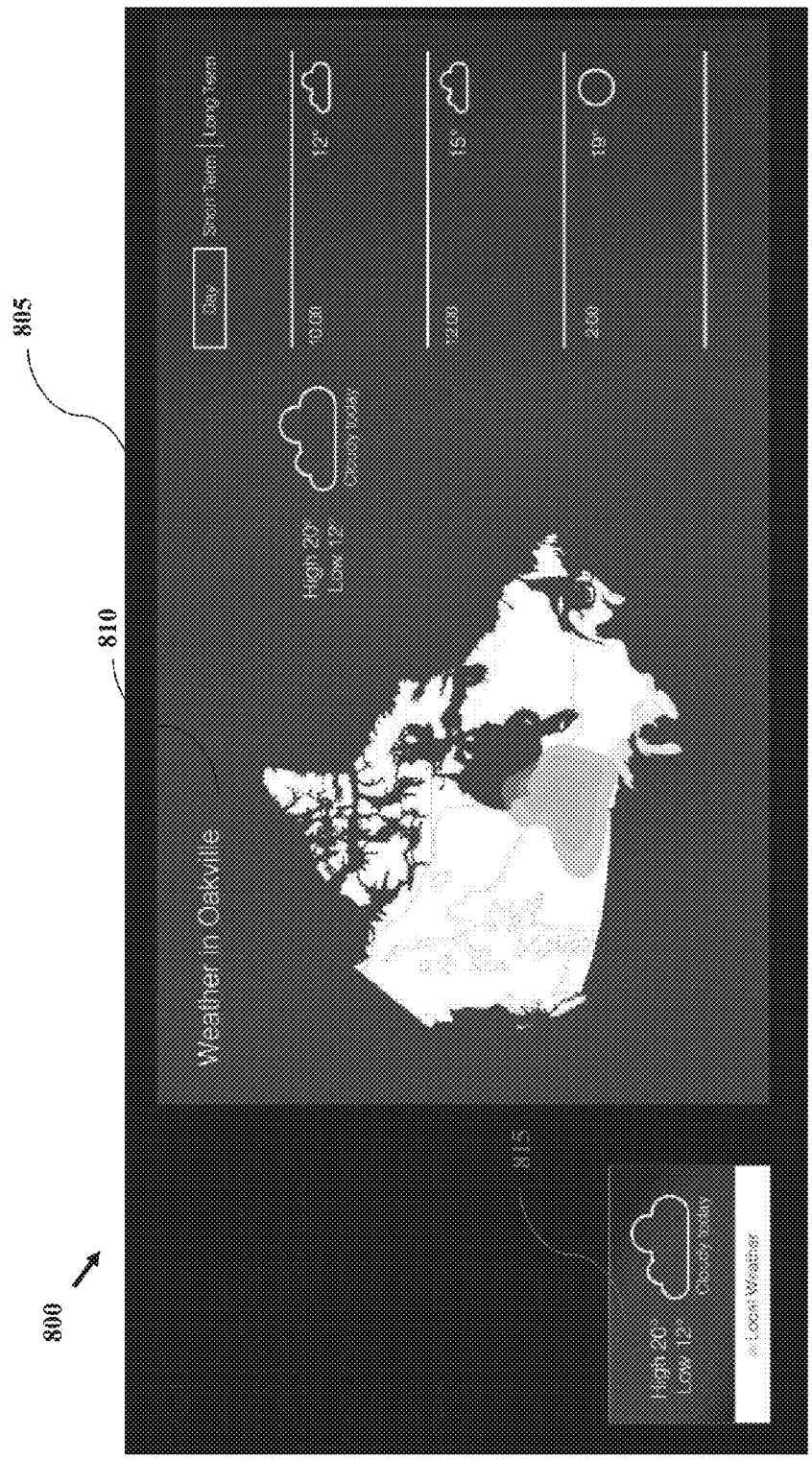
FIG. 8 depicts a graphical representation of display device presentation according to one or more embodiments.
Figure 9:
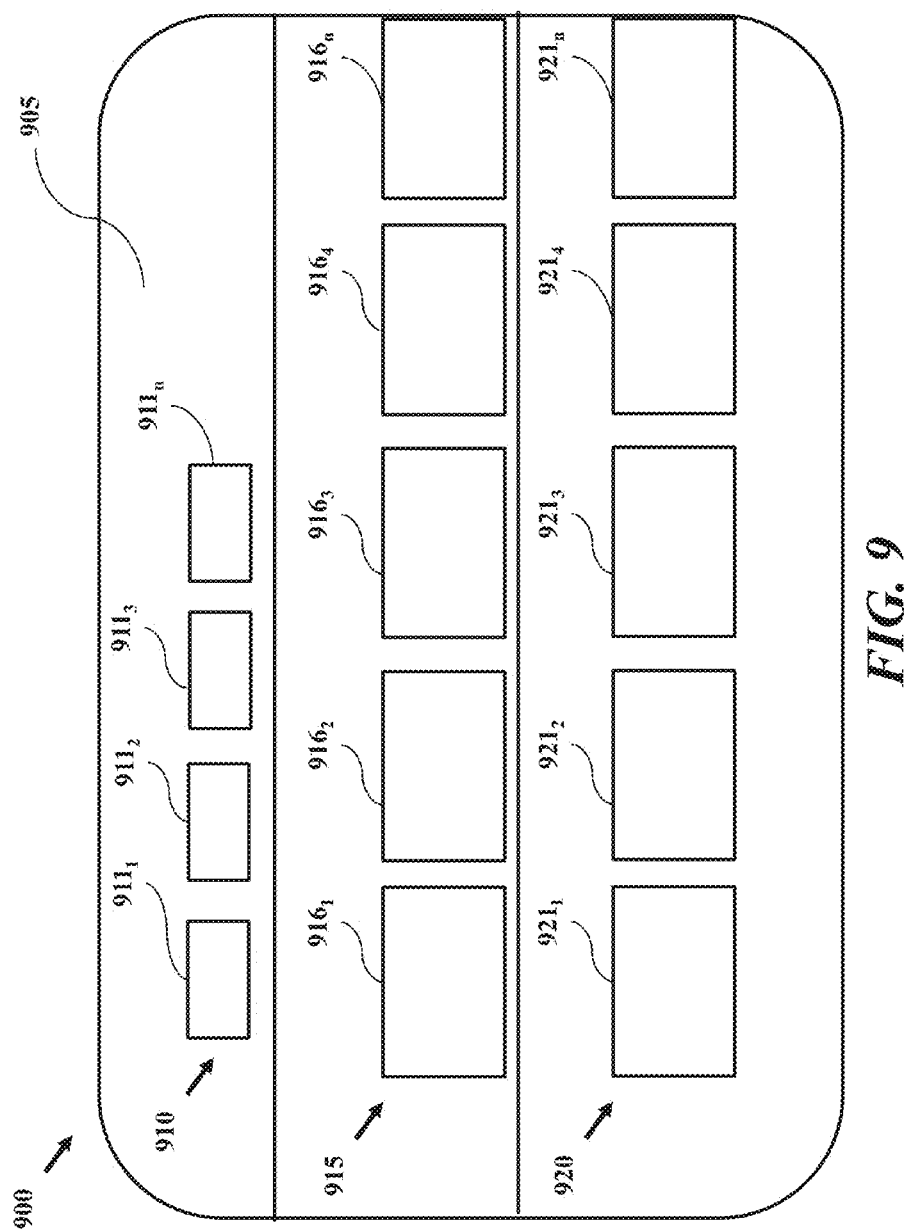
FIG. 9 depicts a graphical representation of a companion device user interface according to one or more embodiments.

FIG. 8 depicts a graphical representation of display device presentation according to one or more embodiments. FIG. 8 depicts a display device configuration 800 with display window 805 for an application home screen according to one or more embodiments. Display device 805 includes application 810 with widget 815. Application 810 with widget 815 may relate to overlays that cover part or all of image content. Application 810 with widget 815, or other overlay elements may be selected from a companion application on a control device. In addition, the position and when the overlay elements are to appear in a display device may be set by the companion device FIG. 9 depicts a graphical representation of a companion device user interface according to one or more embodiments. Companion device 900 (e.g., companion device 105) includes user interface 905. User interface 905 may relate to an application associated with a display device (e.g., display device 110). According to an exemplary embodiment user interface 905 may include one or more rows of graphical elements, or sections, shown as 910, 915 and 920. Row 910 may relate to devices that may be selected or configured and can include a plurality of graphical elements $911_{1-n}$, wherein each element may represent a different device. Row 915 may relate to applications or overlays that may be selected or added to a device, and include a plurality of graphical elements $916_{1-n}$, wherein each element may represent application or overlay. Row 920 may relate to applications or overlays that may be selected or added to a device, and include a plurality of graphical elements $921_{1-n}$, wherein each element may represent application or overlay.

Companion device 900 provides a minimal and simplistic navigation model to access pre-loaded applications and features. Companion device 900 may also allow for management, advanced configuration, remote control, contextual information, an application market, and a feature market. Favorites within each market may be grouped at the front of each listing.

While this disclosure has been particularly shown and described with references to exemplary embodiments thereof, it will be understood by those skilled in the art that various changes in form and details may be made therein without departing from the scope of the claimed embodiments.

What is claimed is:

1. A method for configuring operation of a display device, the method comprising:
   receiving, by a display device, a configuration change from a control device for a navigation bar, wherein the configuration change includes addition of an application for inclusion in the navigation bar and modification to layout of the navigation bar;
   configuring, by the display device, settings for presentation of a navigation bar, wherein the settings are modified by the one or more changes to the navigation bar and wherein the configuration change corresponds to a release of one or more features previously included and inaccessible to settings for presentation of the navigation bar by the display device;
   detecting, by the display device, a display device command, wherein the display device loads a feature set based on the display command, the feature set including at least one of applications and customizations in addition to present operational software for the display device; and
   presenting, by the display device, a navigation bar based on the configuring and in response to the feature set, wherein the navigation bar is presented to include the application, and wherein the feature set identifies addition of the application for inclusion in the navigation bar.

2. The method of claim 1, wherein the display device command relates to at least one of a selection of a menu key and selection of a navigation bar.

3. The method of claim 1, wherein a configuration change includes at least one of a modification to features available for selection in the navigation bar and features for display during wake and sleep operations of the display device in addition to present operational software for the display device.

4. The method of claim 1, wherein presenting a navigation bar based on the configuring and in response to the feature set includes a wake animation wherein the screen fades from a black screen to image data.

5. The method of claim 1, wherein the navigation bar includes graphical elements for selection of one or more of applications, inputs and control menus for the display device, wherein the navigation bar is presented by the display device as an overlay to displayed image content.

6. The method of claim 1, wherein the configuration change is received by the display device from the control device running a companion application to provide configuration changes for the display device.

7. A system comprising:
   a control device; and
   a display device, wherein the display device is configured to
      receive a configuration change from a control device for an overlay element, wherein the configuration change includes one or more changes for presentation of an overlay element for the display device including addition of an application for inclusion in the overlay element and modification to layout of the overlay element;
      configure settings for presentation of the overlay element, wherein the settings are modified by the one or more changes to a navigation bar and wherein the configuration change corresponds to a release of one or more features previously included and inaccessible to settings for presentation of the overlay element by the display device;
      detect a display device command, wherein the display device loads a feature set based on the display command, the feature set including at least one of applications and customizations in addition to present operational software for the display device; and
      present the overlay element based on the configuring and in response to the feature set, and wherein the overlay element is presented to include the application, and wherein the feature set identifies addition of the application for inclusion in the navigation bar.

8. The system of claim 7, wherein the overlay element is a navigation bar.

9. The system of claim 7, wherein the overlay element is an animation for display during wake and sleep operations of the display device.

10. The system of claim 7, wherein the overlay element is at least one of a poster and sticker display.

11. The system of claim 7, wherein the overlay element relates to an application home screen.

12. The system of claim 7, wherein the display device command relates to at least one of a selection of a menu key and selection of a navigation bar.

13. The system of claim 7, wherein a configuration change includes at least one of a modification to features available for selection in the navigation bar and features for display during wake and sleep operations of the display device in addition to present operational software for the display device.

14. The system of claim 7, wherein presenting a navigation bar based on the configuring and in response to the feature set includes a wake animation wherein the screen fades from a black screen to image data.

15. The system of claim 7, wherein the navigation bar includes graphical elements for selection of one or more of applications, inputs and control menus for the display device, wherein the overlay element is presented by the display device as an overlay to displayed image content.

16. The system of claim 7, wherein the configuration change is received by the display device from the control device running a companion application to provide configuration changes for the display device.

17. A method for configuring operation of a display device, the method comprising:
 receiving, by a display device, a configuration change from a control device for an overlay element, wherein the configuration change includes one or more changes for presentation of an overlay element for the display device including addition of an application for inclusion in the overlay element and modification to layout of the overlay element;
 configuring, by the display device, settings for presentation of a overlay element, wherein the settings are modified by the one or more changes to the overlay element and wherein the configuration change corresponds to a release of one or more features previously included and inaccessible to settings for presentation of the overlay element by the display device; and
 detecting, by the display device, a display device command, wherein the display device loads a feature set based on the display command, the feature set including at least one of applications and customizations in addition to present operational software for the display device;
 presenting, by the display device, an overlay element based on the configuring and in response to the feature set, and wherein the overlay element is presented to include the application, and wherein the feature set identifies addition of the application for inclusion in a navigation bar.

18. The method of claim 17, wherein the configuration change is received by the display device from the control device running a companion application to provide configuration changes for the display device.

19. The method of claim 17, wherein the overlay element is an animation for display during wake and sleep operations of the display device.

20. The method of claim 17, wherein the overlay element is at least one of a poster and sticker display.

21. The method of claim 17, wherein the overlay element relates to an application home screen, and wherein the overlay element is presented by the display device as an overlay to displayed image content.

* * * * *